United States Patent
Hillan

(10) Patent No.: US 10,361,754 B2
(45) Date of Patent: Jul. 23, 2019

(54) ENABLING USE OF STAY QUIET REQUESTS IN A NEAR FIELD COMMUNICATION DEVICE

(71) Applicant: QUALCOMM Incorporated, San Diego, CA (US)

(72) Inventor: John Hillan, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 14/942,597

(22) Filed: Nov. 16, 2015

(65) Prior Publication Data

US 2016/0142111 A1 May 19, 2016

Related U.S. Application Data

(60) Provisional application No. 62/081,391, filed on Nov. 18, 2014.

(51) Int. Cl.
*G06K 7/10* (2006.01)
*H04B 5/00* (2006.01)

(52) U.S. Cl.
CPC ......... *H04B 5/0056* (2013.01); *H04B 5/0031* (2013.01); *G06K 7/10039* (2013.01)

(58) Field of Classification Search
None
See application file for complete search history.

(56) References Cited

U.S. PATENT DOCUMENTS

| 8,253,540 | B2 | 8/2012 | Amtmann | |
|---|---|---|---|---|
| 8,284,033 | B2 | 10/2012 | Moran | |
| 2004/0085208 | A1 | 5/2004 | Fukuoka | |
| 2005/0127180 | A1* | 6/2005 | Matsumoto | ......... G06K 7/0008 235/451 |
| 2006/0145816 | A1* | 7/2006 | Koele | ................ G06K 19/0723 340/10.2 |
| 2007/0126059 | A1 | 6/2007 | Dembo et al. | |
| 2010/0012717 | A1* | 1/2010 | Walczyk | ............ G06K 7/10851 235/375 |
| 2013/0303085 | A1 | 11/2013 | Boucher et al. | |

FOREIGN PATENT DOCUMENTS

EP 2782400 A1 * 9/2014 ............ H04W 8/005

OTHER PUBLICATIONS

Thrasher, James, RFID vs NFC What's the Difference?, Oct. 11, 2013.*

(Continued)

*Primary Examiner* — James J Yang
*Assistant Examiner* — Kevin Lau
(74) *Attorney, Agent, or Firm* — Arent Fox, LLP

(57) ABSTRACT

Techniques for enabling a use of one or more signals in a Near Field Communication (NFC) device for NFC communication are described. In an aspect, the methods and apparatus include receiving, at a NFC controller, a stay quiet command from a device host, wherein the stay quiet command includes one or more unique identifiers (UIDs) corresponding to one or more remote NFC endpoints. Further, in an aspect, the methods and apparatus include transmitting, by the NFC controller, a stay quiet response to the device host based at least in part on the stay quiet command.

26 Claims, 9 Drawing Sheets

(56) References Cited

OTHER PUBLICATIONS

International Search Report and Written Opinion—PCT/US2015/061141—ISA/EPO—dated Jan. 22, 2016. (13 total pages).
Almesberger W., "Neo900 NFC Subsystem," Draft, Jan. 5, 2015, 49 Pages.
AN11042, ICODE as NFC Type ICODE Tag, Rev. 1.2—Jul. 1, 2011, 202312, NXP Semiconductors, 34 pages.

\* cited by examiner

ENABLING USE OF STAY QUIET REQUESTS IN A NEAR FIELD COMMUNICATION DEVICE

CLAIM OF PRIORITY UNDER 35 U.S.C. § 119

The present Application for Patent claims the benefit of and priority to Provisional Application No. 62/081,391 entitled "ENABLING USE OF STAY QUIET REQUESTS IN A NEAR FIELD COMMUNICATION DEVICE" filed Nov. 18, 2014, and the provisional application is assigned to the assignee hereof and hereby expressly incorporated by reference herein.

BACKGROUND

The disclosed aspects relate generally to communications between and/or within devices and specifically to improving near field communication, specifically enabling usage of stay quiet requests.

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, near field communication (NFC), etc.

In some NFC devices, ineffective and/or inefficient operation or utilization of communication resources, particularly related to enabling usage of stay quiet requests, may lead to degradations in communication between an NFC device and a device in communication therewith. Even more, the foregoing ineffective and/or inefficient operation may inhibit a user equipment equipped with an NFC device from achieving higher communication quality. Thus, improvements in NFC mode adjustments may be desired.

SUMMARY

The following presents a summary of one or more aspects to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects form as a prelude to the more detailed description presented later.

In accordance with an aspect, a present method relates to enabling a use of one or more commands in a NFC device for NFC communication. The described aspects include receiving, at an NFC controller, a stay quiet command from a device host, wherein the stay quiet command includes one or more unique identifiers (UIDs) corresponding to one or more remote NFC endpoints. The described aspects further include transmitting, by the NFC controller, a stay quiet response to the device host based at least in part on the stay quiet command.

In another aspect, a present computer-readable medium storing computer executable code relates to enabling a use of one or more commands in a NFC device for NFC communication. The described aspects include code for receiving, at an NFC controller, a stay quiet command from a device host, wherein the stay quiet command includes one or more UIDs corresponding to one or more remote NFC endpoints. The described aspects further include code for transmitting, by the NFC controller, a stay quiet response to the device host based at least in part on the stay quiet command.

In a further aspect, a present apparatus relates to enabling a use of one or more commands in a NFC device for NFC communication. The described aspects include means for receiving, at an NFC controller, a stay quiet command from a device host, wherein the stay quiet command includes one or more UIDs corresponding to one or more remote NFC endpoints. The described aspects further include means for transmitting, by the NFC controller, a stay quiet response to the device host based at least in part on the stay quiet command.

In another aspect, a present apparatus relates to enabling a use of one or more commands in a NFC device for NFC communication. The described aspects include a transceiver, a memory configured to store data, and one or more processors communicatively coupled with the transceiver and the memory, wherein the one or more processors and the memory are configured to receive, at an NFC controller, a stay quiet command from a device host, wherein the stay quiet command includes one or more UIDs corresponding to one or more remote NFC endpoints. The described aspects further include transmitting, by the NFC controller, a stay quiet response to the device host based at least in part on the stay quiet command.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein.

DETAILED DESCRIPTION

Figure 1:
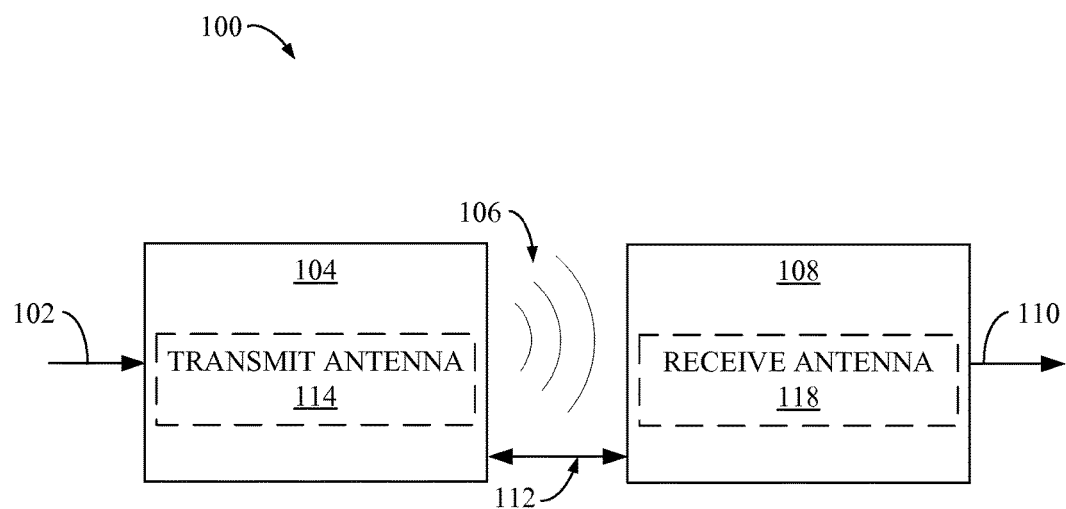
FIG. 1 is a block diagram of a wireless communication system in accordance with an aspect of the present disclosure.

Various aspects are now described with reference to the drawings. In the following description, for purposes of explanation, numerous specific details are set forth to provide a thorough understanding of one or more aspects. It should be understood, however, that such aspect(s) may be practiced without these specific details.

The present aspects generally relate to enabling usage of stay quiet requests between NFC devices. Specifically, commands defined in NFC Forum specifications may correspond to two separate categories: commands that are used to detect, activate, and deactivate a remote device, and commands that are used to communicate with a remote device once activated. The first category is normally defined in "Digital Protocol", and the rules for when it can be used are in "Activity". For example, in current specifications, "SLP-B_REQ" and "SLPB_RES" are defined in the NFC-B technology section of Digital Protocol, and its use is defined in the Collision Resolution (NFC-B) section of Activity. The second category is normally defined in an "Operation" specification, is always used in half-duplex manner, and can be considered as being a higher layer than the first category.

In proposed changes to Digital Protocol to include a new technology ("NFC-V", which is based on ISO/IEC 15693 specifications), there is a new defined command called "SLPV_REQ." However, SLPV_REQ is not used in Activity. Further, SLPV_REQ cannot be thought of as belonging to the second category because it has no response and is thus not half duplex. Thus, at present there is a mandatory command with no defined mechanism for using SLPV_REQ, and no support for it in the NCI specification. A device cannot send it as part of activation or deactivation, nor can it be sent as data.

Accordingly, in some aspects, the present aspects may provide an efficient and effective solution, as compared to current solutions, to enable usage of stay quiet requests between NFC devices. In other words, an NFC device may transmit a stay quiet request as part of an activation or deactivation, or as data. As such, the present aspects provide one or more mechanisms for receiving, at an NFC controller, a stay quiet command from a device host, wherein the stay quiet command includes one or more unique identifiers (UIDs) corresponding to one or more remote NFC endpoints, and transmitting, by the NFC controller, a stay quiet response to the device host based at least in part on the stay quiet command.

Aspects of the present disclosure are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described herein are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Figure 3:
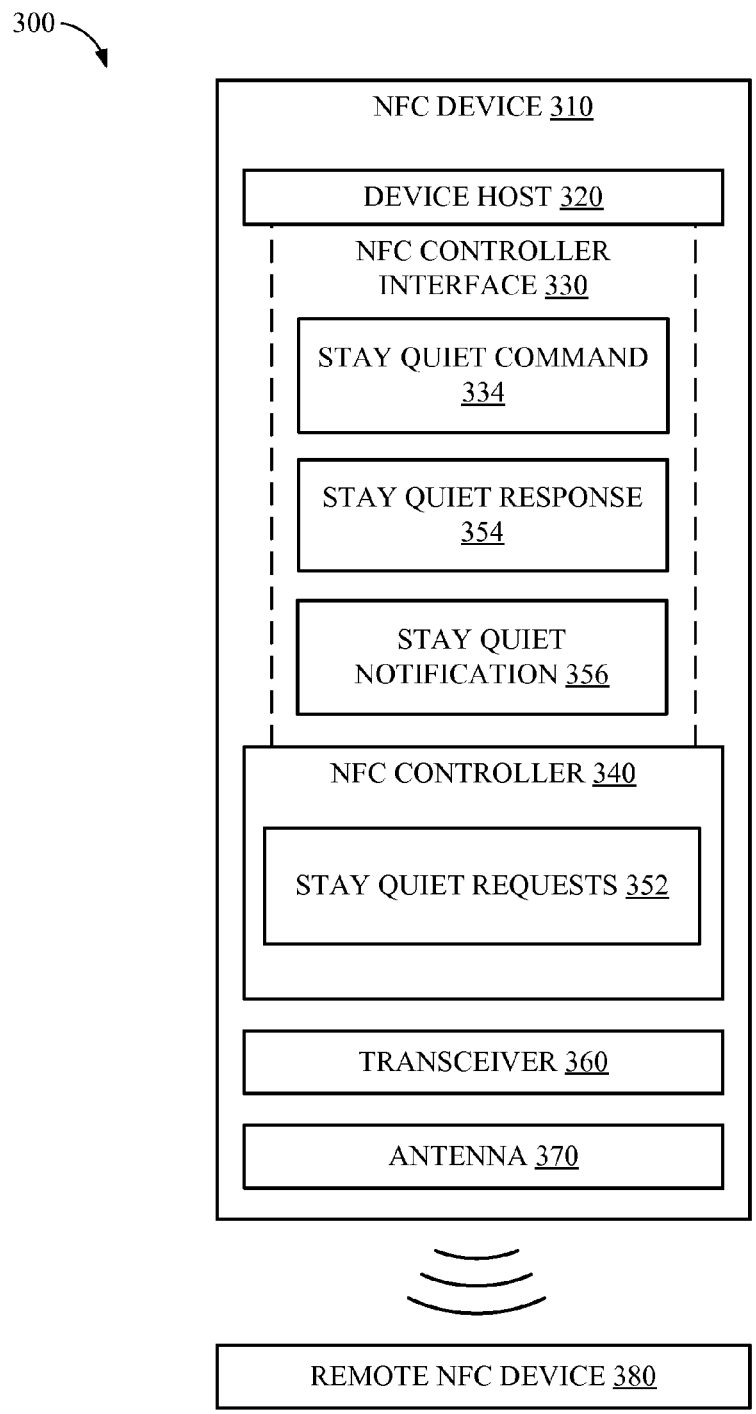
FIG. 3 is a block diagram of an NFC environment in accordance with an aspect of the present disclosure.

FIG. 1 illustrates a wireless transmission or charging system 100, in accordance with various aspects described herein. In some aspects, transmitter 104 may be included as part of NFC device 310 (FIG. 3) configured to enable usage of stay quiet commands as described herein. Specifically, for example, transmitter 104 may form or otherwise be part of transceiver 360 (FIG. 3). Additionally, transmit antenna may form otherwise be part of antenna 370 (FIG. 3). Input power 102 is provided to a transmitter 104 for generating a radiated inductive field 106 for providing energy transfer. A receiver 108 couples to the radiated inductive field 106 and generates an output power 110 for storage or consumption by a device (not shown) coupled to the output power 110. Both the transmitter 104 and the receiver 108 are separated by a distance 112, which is also referred to herein as an operating volume (OV). In one example, transmitter 104 and receiver 108 are configured according to a mutual resonant relationship and when the resonant frequency of receiver 108 and the resonant frequency of transmitter 104 are within a threshold OV, transmission losses between the transmitter 104 and the receiver 108 are minimal (e.g., when the receiver 108 is located in the "near-field" of the radiated inductive field 106).

Transmitter 104 further includes a transmit antenna 114 for transmitting energy and signals. A receiver 108 includes a receive antenna 118 for receiving signal and energy if needed. The transmit antenna 114 and receive antenna 118 can be sized according to applications and devices associated therewith. As stated, an efficient energy transfer can occur by coupling a large portion of the energy in the near-field of the transmitting antenna 114 to a receiving antenna 118 rather than propagating most of the energy in an electromagnetic wave to a far field. When in this near-field, a coupling mode may be developed between the transmit antenna 114 and the receive antenna 118. The area around the antennas 114 and 118 where this near-field coupling may occur is referred to herein as a coupling-mode region.

Figure 2:
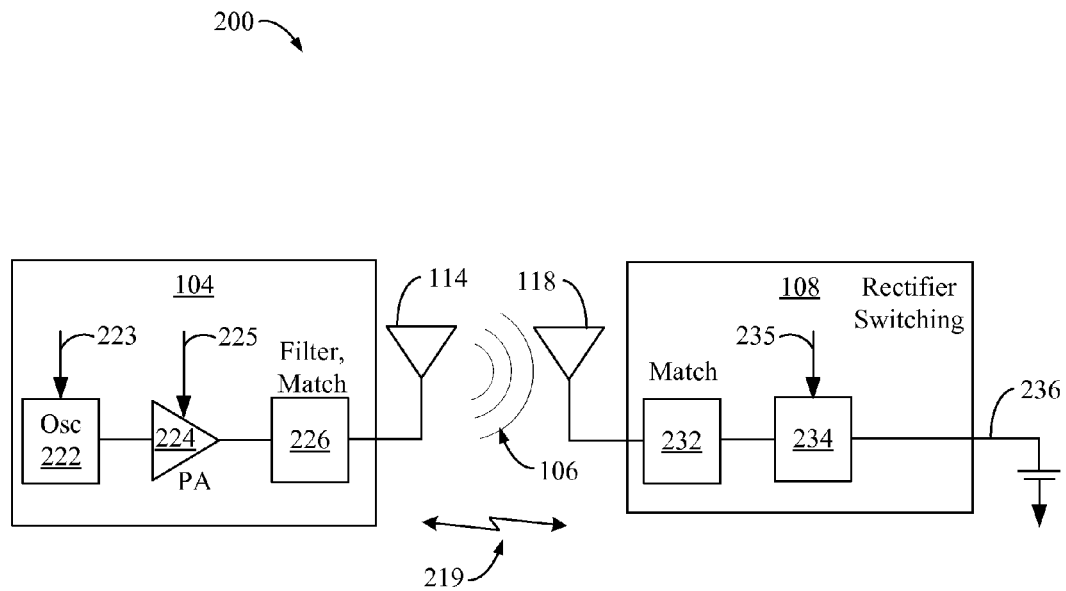
FIG. 2 is a schematic diagram of a wireless communication system in accordance with an aspect of the present disclosure.

In some configurations, where the transmitter 104 and receiver 108 are in very close proximity, matching networks (not shown) related to the antennas 114, 118 that process the signals may become detuned due to high mutual coupling in signals communicated between the transmitter 104 and receiver 108, and thus communications between transmitter 104 and receiver 108 may break down. FIG. 2 is a schematic diagram of an example near field wireless communication system 200. The transmitter 104 includes an oscillator 222, a power amplifier 224 and a filter and matching circuit 226. In some aspects, transmitter 104 may be included as part of NFC device 310 (FIG. 3) configured to enable usage of stay quiet commands as described herein. Specifically, for example, transmitter 104 may form or otherwise be part of transceiver 360 (FIG. 3). Additionally, transmit antenna may otherwise be part of antenna 370 (FIG. 3). The oscillator 222 is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 104 to the transmit antenna 114.

The receiver 108 may include a matching circuit 232 and a rectifier and switching circuit 234 to generate a DC power output to charge a battery 236 as shown in FIG. 2 or power a device coupled to the receiver (not shown), though it is to be appreciated that devices may each have batteries (e.g., in peer-to-peer communications) such that powering by magnetic field may not be needed. The matching circuit 232 may be included to match the impedance of the receiver 108 to the receive antenna 118. The receiver 108 and transmitter 104 may communicate on a separate communication channel 219 (e.g., Bluetooth, WiFi, zigbee, cellular, etc), in an example.

Referring to FIG. 3, in an aspect, communication network 300 may include a NFC device 310 and a remote NFC device 380, both of which may be configured to communicate using NFC. NFC device 310 may include transceiver 360 and antenna 370, each of which may be configured to facilitate communication with remote NFC device 380 using NFC. For example, remote NFC device 380 may correspond to a remote device, card, or tag, connected wirelessly over the NFC radio interface to the NFC device 310. NFC device 310 may, via NFC controller 340, be configured to efficiently enable usage of stay quiet commands between device host 320 and NFC controller 340.

Device host 320 may be configured to provide or otherwise transmit a stay quiet command 334 over the NFC controller interface (NCI) 330 to NFC controller 340. In some aspects, the stay quiet command 334 may cause the NFC controller 340 to transmit one or more stay quiet requests 352 to one or more remote NFC devices 380. Further, the device host 320 may be or otherwise take the form of an execution environment responsible for the overall management of the NFC device 310 and any peripherals. This may include the management (e.g., initialization, configuration, power management, etc.) of the NFC controller 340.

NCI 330 may be configured to facilitate communication at least between the device host 320 and the NFC controller 340. For example, the NCI 330 may be a logical interface between device host 320 and NFC controller 340. Specifically, NCI 330 may be configured to facilitate the transmission of one or more stay quiet commands 334 from device host 320 to NFC controller 340 and one or more stay quiet responses 354 and/or stay quiet notifications 356 from NFC controller 340 to device host 320.

NFC controller 340 may be configured to receive a stay quiet command 334 from device host 320. In some instances, the stay quiet command 334 causes the NFC controller 340 to transmit one or more stay quiet requests 352 to one or more remote NFC devices 380. For example, the NFC controller 340 may be the logical entity responsible for the transmission of data over the NFC radio interface. The NFC controller 340 may have a connection to the device host 320 and may have connections to additional NFC execution environments (NFCEEs). In some instances, a stay quiet command 334 may comprise a payload that includes a field for the number of unique identifiers (UIDs) and list of the one or more UIDs corresponding to one or more of the remote NFC devices 380. The UIDs may be configured to identify each of the remote NFC devices 380 that NFC device 310 is communicating and/or in proximity with. The device host 320 may transmit a single stay quiet command 334 via NFC controller interface 330 to NFC controller 340 where the stay quiet command 334 includes a plurality of UIDs which may cause the NFC controller 340 to transmit a corresponding plurality of stay quiet requests 352 to a plurality of remote NFC devices 380 corresponding to the plurality of UIDs. In the instances where the stay quiet command 334 includes only a single UID then a single stay quiet command 334 may be transmitted corresponding to a single remote NFC device 380 corresponding to the UID.

In some instances, device host 320 may transmit a stay quiet command 334 only when certain circumstances are met. For example, device host 320 may be configured to transmit a stay quiet command 334 only when device host 320 is in a Poll Mode and when the frame RF interface is activated for a Type 5 protocol. In certain aspects, if a Type 5 protocol is activated then the NFC device 310 may be configured to communicate with any device which implements the Type 5 Tag Platform.

In an aspect, NFC controller 340 may be configured to transmit a stay quiet response 354 based at least in part on the stay quiet command 334. For example, once NFC controller 340 receives a stay quiet command 334, it may be configured to either first transmit one or more stay quiet requests 352 to one or more remote NFC devices 380 or first transmit a stay quiet response 354 to device host 320. In the instances where NFC controller 340 first transmits one or more stay quiet requests 352 to one or more remote NFC devices 380, each of the one or more stay quiet requests 352 may be configured with a payload. For example, the payload may include a field for the number of UIDs and list of the one or more UIDs corresponding to each of the one or more remote NFC devices 380. Also, the stay quiet request 352 may be configured with bytes 1-2 set to fixed values defined the digital protocol and bytes 3-10 set as specified in the command parameter to the RF field. In certain instances, one stay quiet request 352 may be transmitted to each remote NFC device 380 communicating and/or in proximity of NFC device 310. As such, each stay quiet request 352 may comprise a payload including the UID of the remote NFC device 380 where the stay quiet request 352 is being transmitted. In the instances where NFC controller 340 first transmits a stay quiet response 354 to device host 320, the stay quiet response 354 may comprise a payload including a status value. The status value may indicate to device host 320 that the stay quiet command 334 was received. Moreover, if NFC controller 340 receives the stay quiet command 334 when one or both of the certain circumstances are not met (e.g., device host 320 is not in Poll Mode or when the frame RF interface is not activated for a Type 5 protocol) the NFC controller 340 may transmit a status error (e.g., a semantic error). Furthermore, the NFC controller 340 may transmit to device host 320 a stay quiet notification 356 based at least in part on the completion of the transmission of the one or more stay quiet requests 354 to the one or more remote NFC devices 380. In certain instances, the stay quiet request 352 is transmitted using a data exchanging protocol utilizing at least one or more parameter values. The one or more parameter values may include one or both of a RF technology mode parameter, which includes a NFC-V technology.

Figure 4:
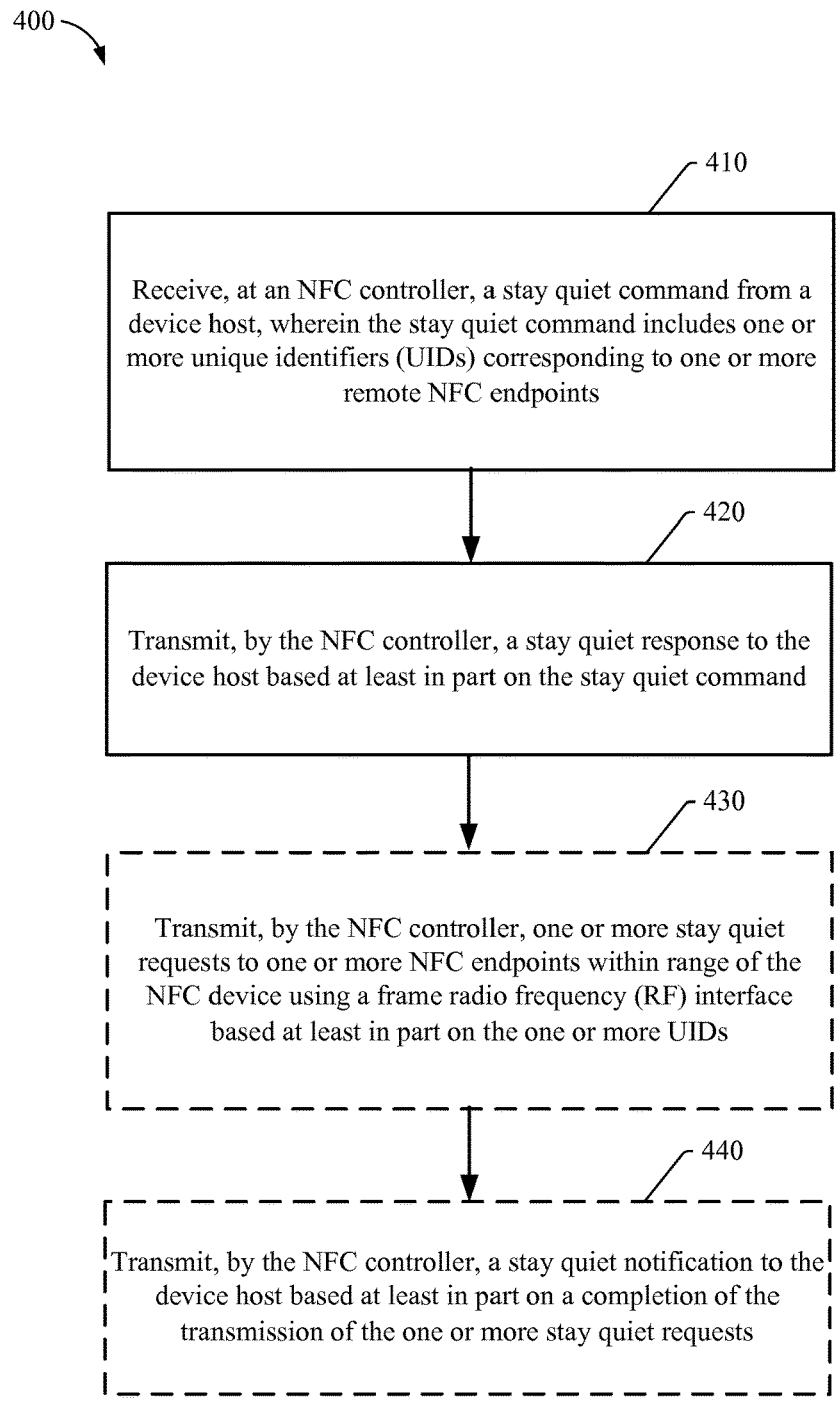
FIG. 4 is a flowchart describing an aspect of adjusting an NFC mode based on an aspect of the present disclosure.

Referring to FIG. 4, in an operational aspect, a NFC device such as NFC device 310 (FIG. 3) may perform one aspect of a method 400 for enabling usage of stay quiet commands between a device host and a NFC controller. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 410, method 400 may receive, at a NFC controller, a stay quiet command from a device host, wherein the stay quiet command includes one or more unique identifiers (UIDs) corresponding to one or more remote NFC endpoints. For example, as described herein, NFC device 310 (FIG. 3) may invoke NFC controller 340 (FIG. 3) to receive, e.g., via one or more buses or communicative couplings, a stay quiet command 334 from device host 320, wherein the stay quiet command 334 includes one or more unique identifiers (UIDs) corresponding to one or more remote NFC endpoints 380.

At block 420, method 400 may transmit, by NFC controller, a stay quiet response to device host based at least in part on the stay quiet command. For instance, as described herein, NFC device 310 (FIG. 3) may invoke NFC controller 340 (FIG. 3) to transmit, e.g., via one or more buses or communicative couplings, a stay quiet response 354 to the device host 320 based at least in part on the stay quiet command 334.

At block 430, method 400 may optionally transmit, by the NFC controller, one or more stay quiet requests to one or more NFC endpoints within range of the NFC device based at least in part on the one or more UIDs. For instance, as described herein, NFC device 310 (FIG. 3) may invoke NFC controller 340 (FIG. 3) to transmit, e.g., via one or more buses or communicative couplings and transceiver 360 and antenna 370, one or more stay quiet requests 352 to one or more NFC endpoints, e.g., remote NFC device 380, within range of the NFC device 310 based at least in part on the one or more UIDs. In certain instances, the one or more stay quiet requests 352 may cause the one or more remote NFC devices 380 within range of the NFC device 310 whose UID matches a UID in one of the stay quiet requests 352 to enter into a quiet state and ignore some or all of the subsequent communications from the NFC device 310.

At block 440, method 400 may optionally transmit, by the NFC controller, a stay quiet notification to the device host based at least in part on a completion of the transmission of the one or more stay quiet requests. For instance, as described herein, NFC device 310 (FIG. 3) may invoke NFC controller 340 (FIG. 3) to transmit, e.g., via one or more buses or communicative couplings, a stay quiet notification 356 to the device host 320 based at least in part on a completion of the transmission of the one or more stay quiet requests 356.

Figure 5:
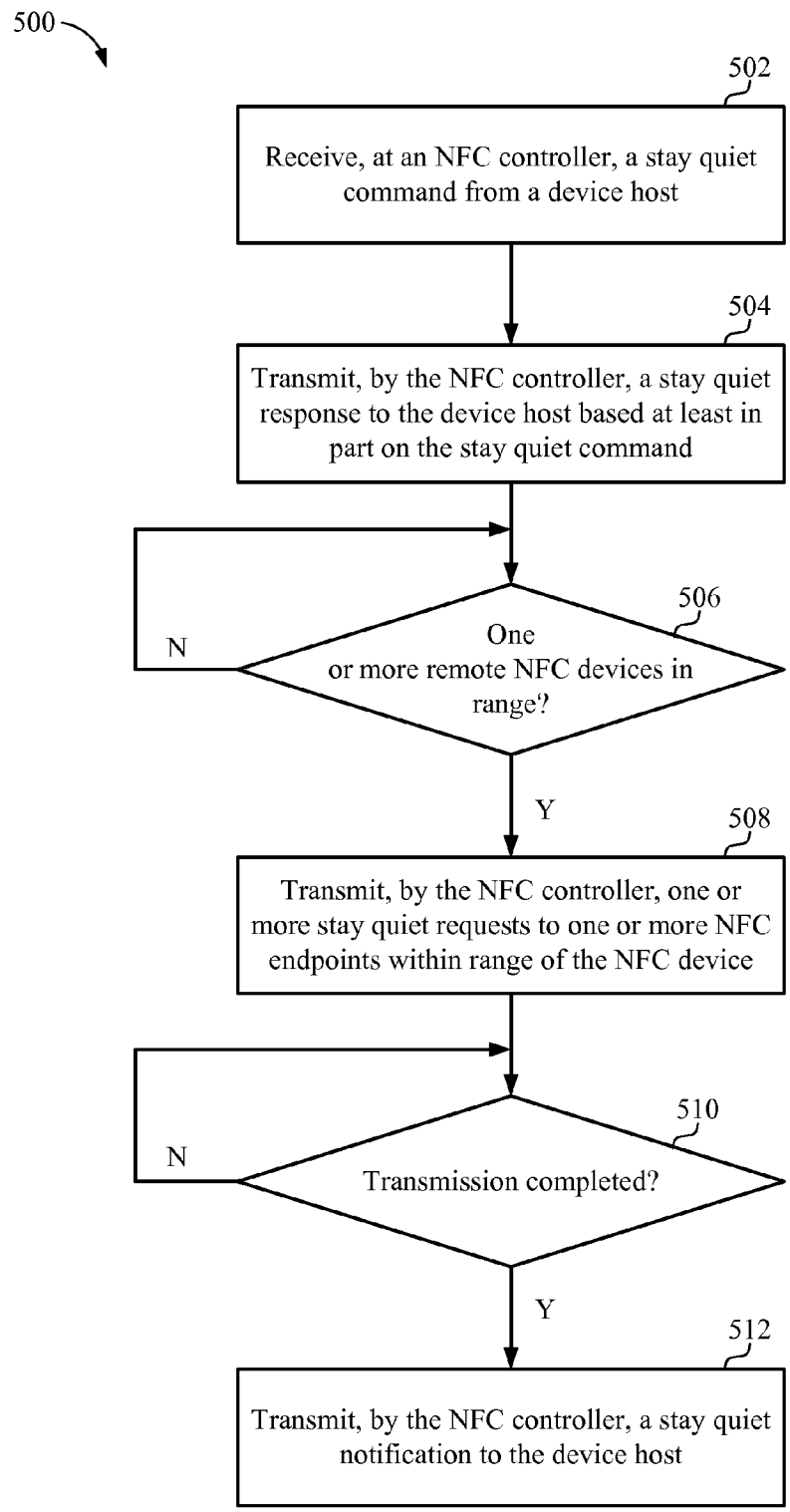
FIG. 5 is a flowchart describing an aspect of adjusting an NFC mode in accordance of an aspect of the present disclosure.

Referring to FIG. 5, in an operational aspect, a NFC device such as NFC device 310 (FIG. 3) may perform one aspect of a method 500 for enabling usage of stay quiet commands between a device host and a NFC controller. In an aspect, method 500 may be configured to enable an NFC device to establish checks to determine whether to transmit stay quiet requests and notifications. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 502, method 500 may receive, at a NFC controller, a stay quiet command from a device host, wherein the stay quiet command includes one or more unique identifiers (UIDs) corresponding to one or more remote NFC endpoints. For example, as described herein, NFC device 310 (FIG. 3) may invoke NFC controller 340 (FIG. 3) to receive, e.g., via one or more buses or communicative couplings, a stay quiet command 334 from device host 320, wherein the stay quiet command 334 includes one or more unique identifiers (UIDs) corresponding to one or more remote NFC endpoints 380.

At block 504, method 500 may transmit, by NFC controller, a stay quiet response to device host based at least in part on the stay quiet command. For instance, as described herein, NFC device 310 (FIG. 3) may invoke NFC controller 340 (FIG. 3) to transmit, e.g., via one or more buses or communicative couplings, a stay quiet response 354 to the device host 320 based at least in part on the stay quiet command 334.

At block 506, method 500 may determine whether one or more remote NFC devices are in range of the NFC device. For instance, as described herein, NFC device 310 (FIG. 3) may determine whether one or more remote NFC devices 380 are in range of the NFC device 310. For example, if NFC device 310 determines that one or more remote NFC devices 380 are in range of the NFC device 310 then method 500 may proceed to block 508. However, if NFC device 310 determines that one or more remote NFC devices 380 are not in range of the NFC device 310 then method 500 may remain at block 506. The NFC device and remote NFC device may be linked by their mutual inductance, as in an air core transformer, with the primary coil being the NFC antenna coil and the secondary coil being the antenna coil of the remote NFC device. The alternating magnetic field penetrates the antenna coil of the remote NFC device when it is in the near field region, inducing an alternating current in the antenna coil of the remote NFC device.

At block 508, method 500 may transmit, by the NFC controller, one or more stay quiet requests to one or more NFC endpoints within range of the NFC device. For instance, as described herein, NFC device 310 (FIG. 3) may invoke NFC controller 340 (FIG. 3) to transmit, e.g., via one or more buses or communicative couplings and transceiver 360 and antenna 370, one or more stay quiet requests 352 to one or more NFC endpoints (e.g., remote NFC device 380) within range of the NFC device 310 based at least in part on the one or more UIDs. In certain instances, the one or more stay quiet requests 352 may cause the one or more remote NFC devices 380 within range of the NFC device 380 whose UID matches a UID in one of the stay quiet requests 352 to enter into a quiet state and ignore some or all of the subsequent communications from the NFC device 310.

At block 510, method 500 may determine whether the transmission of the one or more stay quiet requests are completed. For instance, as described herein, NFC device 310 (FIG. 3) may determine whether the transmission of the one or more stay quiet requests 356 are completed. In an aspect, NFC device 310 may determine completion of the stay quiet requests 356 based on either signals received from one or more of the NFC endpoints or expiration of a timer indicating that the stay quiet requests should be have been received. For example, if NFC device 310 determines that the transmission of the one or more stay quiet requests 356 are completed then method 500 may proceed to block 512. However, if NFC device 310 determines that the transmission of the one or more stay quiet requests 356 are not completed then method 500 may remain at block 508.

At block 512, method 500 may transmit, by the NFC controller, a stay quiet notification to the device host based at least in part on a completion of the transmission of the one or more stay quiet requests. For instance, as described herein, NFC device 310 (FIG. 3) may invoke NFC controller 340 (FIG. 3) to transmit, e.g., via one or more buses or communicative couplings, a stay quiet notification 356 to the device host 320 based at least in part on a completion of the transmission of the one or more stay quiet requests 356.

Figure 6:
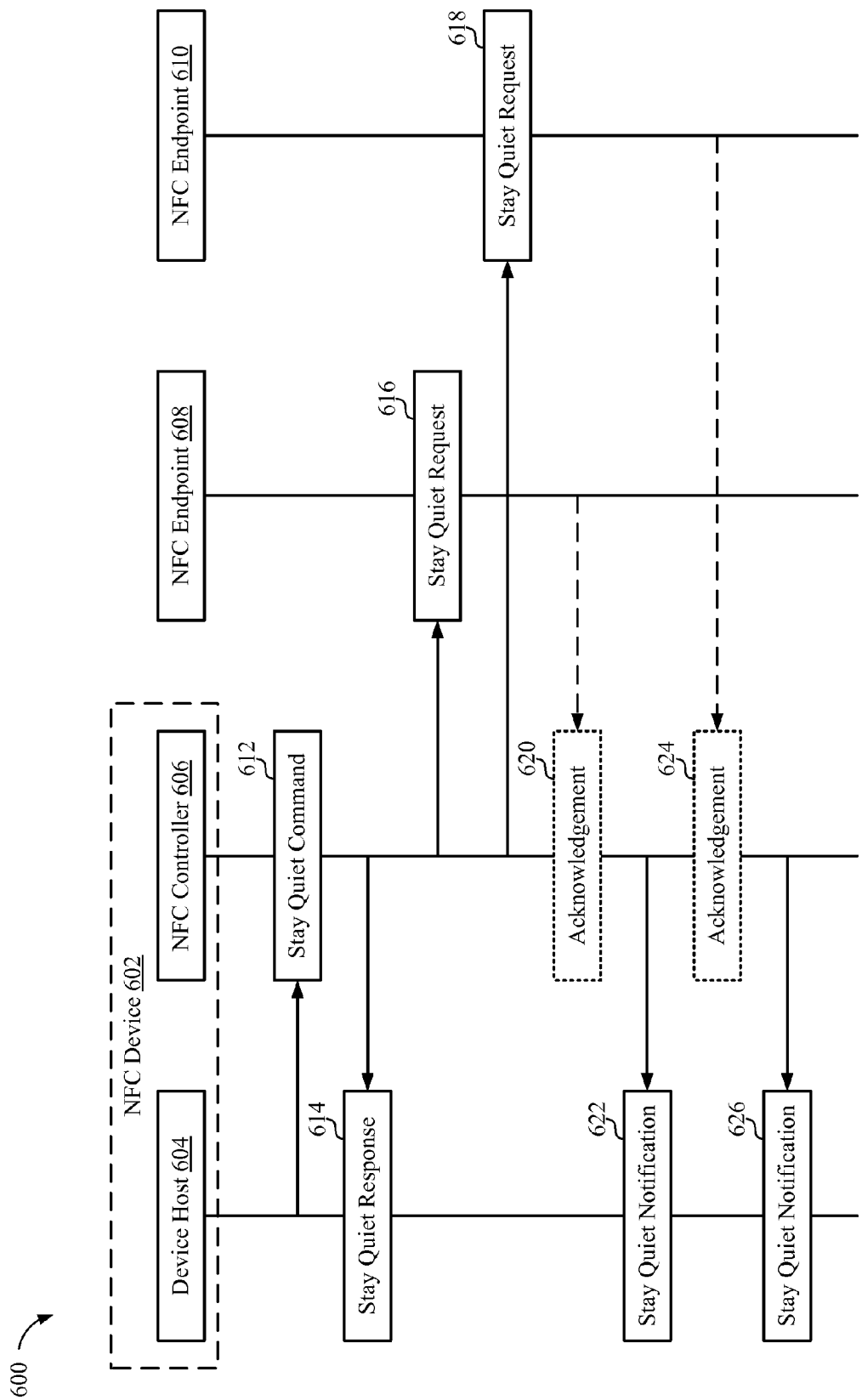
FIG. 6 is a conceptual diagram describing an aspect of adjusting an NFC mode in accordance of an aspect of the present disclosure.

FIG. 6 illustrates a diagram 600 having an example for enabling a use of one or more signals in a NFC device for NFC communication such as but not limited to stay quiet requests and notifications. For example, in an aspect, NFC device 602 may include device host 604 and NFC controller 606, and may be within range of one or more NFC endpoints, such as NFC endpoints 608 and 610. In an aspect, NFC device 610, device host 604 and NFC controller 606 may be similar to or the same as NFC device 310 (FIG. 3), device host 320, and NFC controller 340. Moreover, NFC endpoints 608 and 610 may be similar to or the same as remote NFC device 380 (FIG. 3).

In an aspect, for example, device host 604 may transmit a stay quiet command 612 to NFC controller 606. In an instance, the stay quiet command 612 may include one or more UIDs corresponding to one or more NFC endpoints, such as NFC endpoints 608 and/or 610. In response to the stay quiet command 612, NFC controller 606 may transmit a stay quiet response 614 to device host 604. After transmitting the stay quiet response 614, NFC controller 606 may transmit one or more stay quiet requests to one or more NFC endpoints. For example, NFC controller 606 may transmit a stay quiet request 616 to NFC endpoint 608 and a stay quiet request 618 to NFC endpoint 610. NFC controller 606 may transmit stay quiet requests 616 and 618 simultaneously, or concurrently, or in sequential order. Further, NFC device 602 and/or NFC controller 606 may determine whether transmission of the one or more stay quiet requests are complete. In an instance, NFC device 602 and/or NFC controller 606 may determine that transmission of the one or more stay quiet requests are complete if an acknowledgement signal is received from the one or more NFC endpoints. In this instance, NFC device 602 and/or NFC controller 606 may receive acknowledgement signals 620 and 624 from NFC endpoints 608 and 610, respectively. In response to the completion of the one or more stay quiet requests, NFC controller 606 may transmit stay quiet notifications corresponding to each of the one or more stay quiet requests to device host 604. For example, upon reception of acknowledgement signals 620 and 624, NFC controller 606 may transmit stay quiet notifications 622 and 626, respectively, to device host 604.

Figure 7:
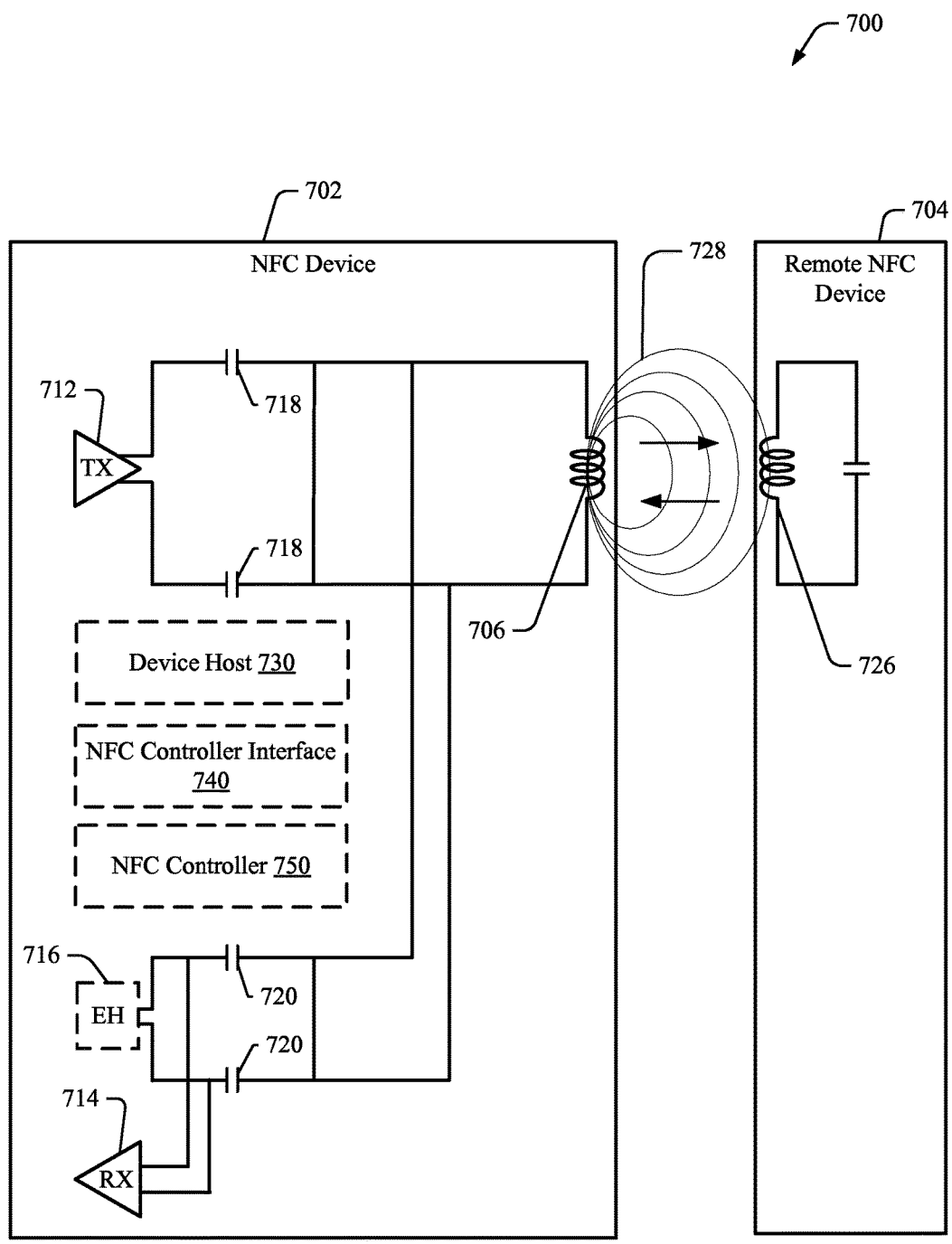
FIG. 7 is a block diagram of another NFC environment in accordance with an aspect of the present disclosure.

With reference to FIG. 7, a block diagram of a communication network 700 according to an aspect is illustrated. Communication network 700 may include a NFC device 702 and a remote NFC device 704 that may be configured to communicate using NFC. NFC device 702 may include a NFC antenna coil 706 configured to facilitate NFC communications with remote NFC device 704, which may have a similar NFC coil 726. NFC device 702 may be the same as or similar to NFC device 310 (FIG. 3) configured to enable usage of stay quiet commands as described herein. For example, NFC device 702 may include device host 730, NFC controller interface 740 and NFC controller 750. Further, remote NFC device 704 may be the same as or similar to remote NFC device 380 (FIG. 3).

As part of NFC communications, NFC antenna coil 706 may generate an electromagnetic field in the area around the NFC antenna coil 706. The strength of the field may depend on the power source and the size and number of turns in NFC antenna coil 706. Further, impedance mismatches may cause a range of amplitude/phase changes dependant on size and inductance of NFC antenna coil 706 in the magnetic field 728. Capacitor 718 may be connected in parallel with the NFC antenna coil 706, where a transmitter component 712 and capacitors 718 may form an RLC oscillator establishing a resonant circuit with a frequency that corresponds to one or more transmission frequencies of the NFC device 702.

Because the wavelength of the frequency used is several times greater than the close proximity distance between the NFC antenna coil 706 and the antenna coil 726 of the remote NFC device 704, the electromagnetic field can be treated as an alternating magnetic field 728. This region of close proximity is referred to as the near field region. The NFC device 702 and remote NFC device 704 may be linked by their mutual inductance, as in an air core transformer, with the primary coil being the NFC antenna coil 706 and the secondary coil being the antenna coil 726 of the remote NFC device 704. The alternating magnetic field 728 penetrates the antenna coil 726 of the remote NFC device 704 when it is in the near field region, inducing an alternating current in the antenna coil 726 of the remote NFC device 704.

When operating in a listening mode, the NFC antenna coil 706, capacitors 720, optional energy harvester (EH) 716 and a receiver component 714 may form an RLC oscillator establishing a resonant circuit over which modulation of signal by remote NFC device 704 can be detected. When operating in a transmitting mode, NFC device 702 may apply a variable load resistance to the NFC antenna coil 706, thereby modulating magnetic field 728, to send a transmitted signal to transfer data to the remote NFC device 704.

Figure 8:
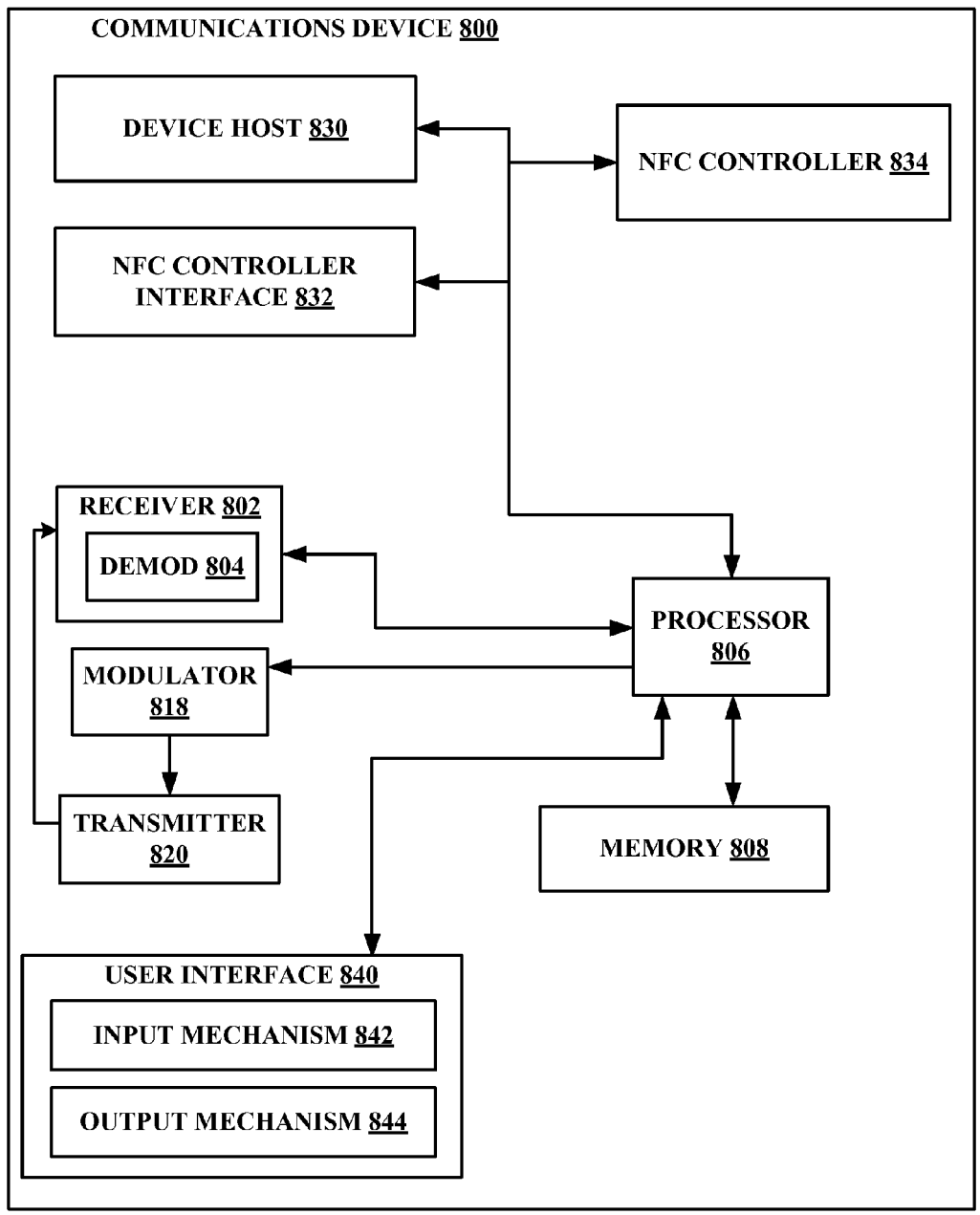
FIG. 8 is a functional block diagram example architecture of a communications device in accordance with an aspect of the present disclosure.

FIG. 8 illustrates an example architecture of communications device 800. Communications device may include NFC device 310 (FIG. 3), 702 (FIG. 7), remote NFC device 380 (FIG. 3), 704 (FIG. 7), etc., and may thus include components thereof and/or perform the associated functions described above. As depicted in FIG. 8, communications device 800 includes receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can include a demodulator 804 that can demodulate received symbols and provide them to processor 806 for channel estimation. Processor 806 can be a processor dedicated to analyzing information received by receiver 802 and/or generating information for transmission by transmitter 820, a processor that controls one or more components of communications device 800, and/or a processor that both analyzes information received by receiver 802, generates information for transmission by transmitter 820, and controls one or more components of communications device 800. Further, signals may be prepared for transmission by transmitter 820 through modulator 818 which may modulate the signals processed by processor 806.

Communications device 800 can additionally include memory 808 that is operatively coupled to processor 806 and that can store data to be transmitted, received data, information related to available channels, TCP flows, data associated with analyzed signal and/or interference strength, information related to an assigned channel, power, rate, or the like, and any other suitable information for estimating a channel and communicating via the channel.

Further, transmitter 820 can generate a transmission signal for a transmitted carrier at a transmit circuit, and receiver 802 can receive a received carrier at a receive circuit. As described, transmitter 820 can be looped back to receiver 802 so the receiver 802 can receive the unmodulated carrier. It will be appreciated that data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 808 of the subject systems and methods may comprise, without being limited to, these and any other suitable types of memory. For example, memory 808 can include instructions for performing the functions of the various components described herein.

Communications device 800 may include NFC controller interface (NCI) 832. In an aspect, NCI 832 may be configured to enable communications between a NFC controller 834 and device host 830. Additionally, communications device 800 may include user interface 840. User interface 840 may include input mechanisms 842 for generating inputs into communications device 800, and output mechanism 844 for generating information for consumption by the user of the communications device 800. For example, input mechanism 842 may include a mechanism such as a key or keyboard, a mouse, a touch-screen display, a microphone, etc. Further, for example, output mechanism 844 may include a display, an audio speaker, a haptic feedback mechanism, etc. In the illustrated aspects, the output mechanism 844 may include a display configured to present media content that is in image or video format or an audio speaker to present media content that is in an audio format.

Figure 9:
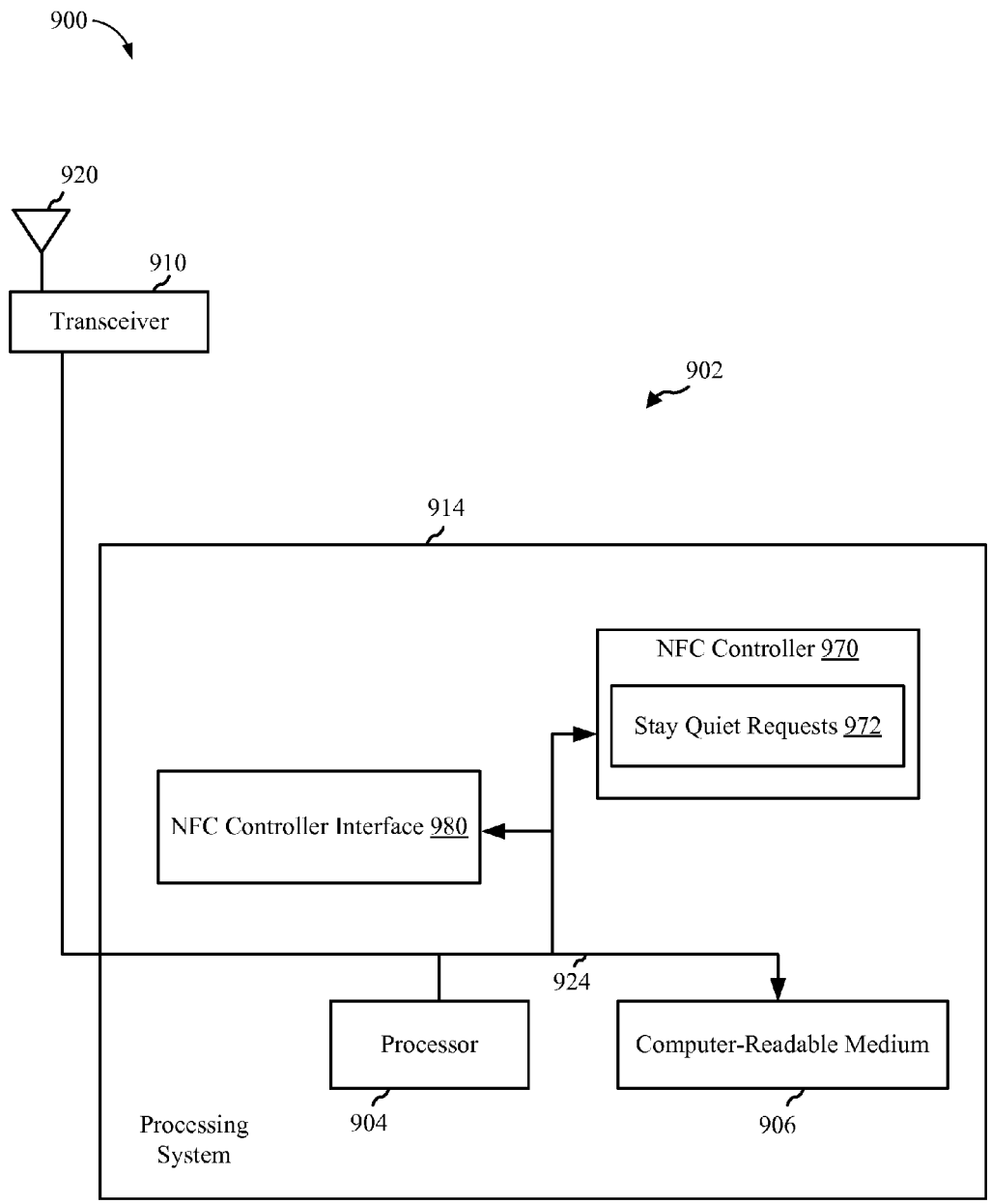
FIG. 9 is a diagram illustrating an example of a hardware implementation for an apparatus employing a processing system.

FIG. 9 is a diagram 900 illustrating an example of a hardware implementation for an apparatus 902 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 970, 972, 980, and the computer-readable medium 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to two or more antennas 920. The transceiver 910 provides a means for communicating with various other apparatus over a transmission medium. The processing system 914 includes a processor 904 coupled to a computer-readable medium 906. The processor 904 is responsible for general processing, including the execution of software stored on the computer-readable medium 906. The software, when executed by the processor 904, causes the processing system 914 to perform the various functions described supra for any particular apparatus. The computer-readable medium 906 may also be used for storing data that is manipulated by the processor 904 when executing software. The processing system further includes at least one of the modules 970, 972, and 980. The modules may be software modules running in the processor 904, resident/stored in the computer-readable medium 906, one or more hardware modules coupled to the processor 904, or some combination thereof. In an aspect, the processing system 914 may be a component of the communications device 800 (FIG. 8) and may include the memory 808 and/or at least one of transmitter 820, receiver 802, and processor 806.

In a configuration, the apparatus 800/902 for enabling a use of one or more signals in a NFC device for NFC communication includes means for receiving, at an NFC controller, a stay quiet command from a device host, wherein the stay quiet command includes one or more UIDs corresponding to one or more remote NFC endpoints; and means for transmitting, by the NFC controller, a stay quiet response to the device host based at least in part on the stay quiet command.

As described supra, the processing system 914 may include the transmitter 820, receiver 802, and processor 806. As such, in one configuration, the aforementioned means may be the transmitter 820, receiver 802, and/or processor 806 configured to perform the functions recited by the aforementioned means.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC,-f, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configured to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of enabling a use of one or more signals in a Near Field Communication (NFC) device for NFC communication, comprising:
receiving, at an NFC controller of the NFC device, a stay quiet command from a device host of the NFC device, the stay quiet command comprising a payload that includes a field for a number of unique identifiers (UIDs) and a list of one or more UIDs corresponding to one or more remote NFC endpoints;
transmitting, by the NFC controller, a stay quiet response to the device host based at least in part on the stay quiet command, the stay quiet response indicating that the stay quiet command was received;
determining whether the stay quiet command is received when the device host is in a Poll Mode and a frame radio frequency (RF) interface is activated for a Type 5 protocol;
transmitting, by the NFC controller, one or more stay quiet requests to the one or more remote NFC endpoints within range of the NFC device based at least in part on the one or more UIDs and based on a determination that the stay quiet command is received when the device host is in the Poll Mode and the frame RF interface is activated for the Type 5 protocol, wherein each of the one or more stay quiet requests comprises a payload including an UID of the one or more UIDs corresponding to a remote NFC endpoint of the one or more remote NFC endpoints; and
transmitting, by the NFC controller, a status error to the device host of the NFC device based on a determination that the stay quiet command is received when the device host is not in the Poll Mode and the frame RF interface is not activated for the Type 5 protocol, the status error indicating that the one or more stay quiet requests will not be transmitted.

2. The method of claim 1, further comprising:
transmitting, by the NFC controller, a stay quiet notification to the device host based at least in part on a completion of the transmission of the one or more stay quiet requests.

3. The method of claim 1, wherein the one or more stay quiet requests is transmitted using a data exchanging protocol using at least one or more parameter values.

4. The method of claim 3, wherein the one or more parameter values include one or both of a RF technology and a mode parameter.

5. The method of claim 4, wherein the RF technology and mode parameter correspond to an NFC-V technology.

6. The method of claim 1, wherein the NFC controller transmits a number of stay quiet requests corresponding to the number of remote NFC endpoints.

7. The method of claim 1, wherein each of the one or more remote NFC endpoints within range of the NFC device include a UID and are configured to enter into a quiet state based at least in part on determining that one of the one or more UIDs in the one or more stay quiet request matches the UID.

8. The method of claim 1, wherein the stay quiet response includes a status value indicating to the device host that the stay quiet command was received.

9. The method of claim 1, wherein the one or more remote NFC endpoints include at least one or more of a remote NFC tag, or a peer NFC device, or a reader device, or a writer device, or an NFC card.

10. An apparatus for enabling a use of one or more signals in a Near Field Communication (NFC) device for NFC communication, comprising:
means for receiving, at the NFC device, a stay quiet command from a device host of the NFC device, the stay quiet command comprising a payload that includes a field for a number of unique identifiers (UIDs) and a list of one or more UIDs corresponding to one or more remote NFC endpoints;
means for transmitting a stay quiet response to the device host based at least in part on the stay quiet command, the stay quiet response indicating that the stay quiet command was received;
means for determining whether the stay quiet command is received when the device host is in a Poll Mode and a frame radio frequency (RF) interface is activated for a Type 5 protocol;
means for transmitting one or more stay quiet requests to the one or more remote NFC endpoints within range of the NFC device based at least in part on the one or more UIDs and based on a determination that the stay quiet command is received when the device host is in the Poll Mode and the frame RF interface is activated for the Type 5 protocol, wherein each of the one or more stay quiet requests comprises a payload including an UID of the one or more UIDs corresponding to a remote NFC endpoint of the one or more remote NFC endpoints; and
means for transmitting, by the NFC controller, a status error to the device host of the NFC device based on a determination that the stay quiet command is received when the device host is not in the Poll Mode and the frame RF interface is not activated for the Type 5 protocol, the status error indicating that the one or more stay quiet requests will not be transmitted.

11. The apparatus of claim 10, further comprising:
means for transmitting a stay quiet notification to the device host based at least in part on a completion of the transmission of the one or more stay quiet requests.

12. The apparatus of claim 10, wherein the one or more stay quiet requests is transmitted using a data exchanging protocol using at least one or more parameter values.

13. The apparatus of claim 12, wherein the one or more parameter values include one or both of an RF technology and a mode parameter.

14. An apparatus for enabling a use of one or more signals in a Near Field Communication (NFC) device for NFC communication, comprising:
a memory configured to store data; and
one or more processors communicatively coupled with the memory, wherein the one or more processors and the memory are configured to:
receive, at an NFC controller of the NFC device, a stay quiet command from a device host of the NFC device, the stay quiet command comprising a payload that includes a field for a number of unique identifiers (UIDs) and a list of one or more UIDs corresponding to one or more remote NFC endpoints;
transmit, by the NFC controller, a stay quiet response to the device host based at least in part on the stay quiet command, the stay quiet response indicating that the stay quiet command was received;
determine whether the stay quiet command is received when the device host is in a Poll Mode and a frame radio frequency (RF) interface is activated for a Type 5 protocol;

transmit, by the NFC controller, one or more stay quiet requests to the one or more remote NFC endpoints within range of the NFC device based at least in part on the one or more UIDs and based on a determination that the stay quiet command is received when the device host is in the Poll Mode and the frame RF interface is activated for the Type 5 protocol, wherein each of the one or more stay quiet requests comprises a payload including an UID of the one or more UIDs corresponding to a remote NFC endpoint of the one or more remote NFC endpoints; and transmit, by the NFC controller, a status error to the device host of the NFC device based on a determination that the stay quiet command is received when the device host is not in the Poll Mode and the frame RF interface is not activated for the Type 5 protocol, the status error indicating that the one or more stay quiet requests will not be transmitted.

15. The apparatus of claim 14, wherein the one or more processors and the memory are further configured to:
transmit, by the NFC controller, a stay quiet notification to the device host based at least in part on a completion of the transmission of the one or more stay quiet requests.

16. The apparatus of claim 14, wherein the one or more stay quiet requests is transmitted using a data exchanging protocol using at least one or more parameter values.

17. The apparatus of claim 16, wherein the one or more parameter values include one or both of an RF technology and a mode parameter.

18. The apparatus of claim 17, wherein the RF technology and mode parameter correspond to an NFC-V technology.

19. The apparatus of claim 14, wherein the NFC controller transmits a number of stay quiet requests corresponding to the number of remote NFC endpoints.

20. The apparatus of claim 14, wherein each of the one or more remote NFC endpoints within range of the NFC device include a UID and are configured to enter into a quiet state based at least in part on determining that one of the one or more UIDs in the one or more stay quiet request matches the UID.

21. The apparatus of claim 14, wherein the stay quiet response includes a status value indicating to the device host that the stay quiet command was received.

22. The apparatus of claim 14, wherein the one or more remote NFC endpoints include at least one or more of a remote NFC tag, or a peer NFC device, or a reader device, or a writer device, or an NFC card.

23. A tangible computer-readable medium storing non-transitory processor-executable code for enabling a use of one or more signals in a Near Field Communication (NFC) device for NFC communication, comprising:
code for receiving, at an NFC controller of the NFC device, a stay quiet command from a device host of the NFC device, the stay quiet command comprising a payload that includes a field for a number of unique identifiers (UIDs) and a list of one or more UIDs corresponding to one or more remote NFC endpoints;
code for transmitting, by the NFC controller, a stay quiet response to the device host based at least in part on the stay quiet command, the stay quiet response indicating that the stay quiet command was received;
code for determining whether the stay quiet command is received when the device host is in a Poll Mode and a frame radio frequency (RF) interface is activated for a Type 5 protocol;
code for transmitting, by the NFC controller, one or more stay quiet requests to the one or more remote NFC endpoints within range of the NFC device based at least in part on the one or more UIDs and based on a determination that the stay quiet command is received when the device host is in the Poll Mode and the frame RF interface is activated for the Type 5 protocol, wherein each of the one or more stay quiet requests comprises a payload including an UID of the one or more UIDs corresponding to a remote NFC endpoint of the one or more remote NFC endpoints; and
code for transmitting, by the NFC controller, a status error to the device host of the NFC device based on a determination that the stay quiet command is received when the device host is not in the Poll Mode and the frame RF interface is not activated for the Type 5 protocol, the status error indicating that the one or more stay quiet requests will not be transmitted.

24. The tangible computer-readable medium of claim 23, further comprising:
code for transmitting, by the NFC controller, a stay quiet notification to the device host based at least in part on a completion of the transmission of the one or more stay quiet requests.

25. The tangible computer-readable medium of claim 23, wherein the one or more stay quiet requests is transmitted using a data exchanging protocol using at least one or more parameter values.

26. The tangible computer-readable medium of claim 25, wherein the one or more parameter values include one or both of an RF technology and a mode parameter.

* * * * *